Figure 1:
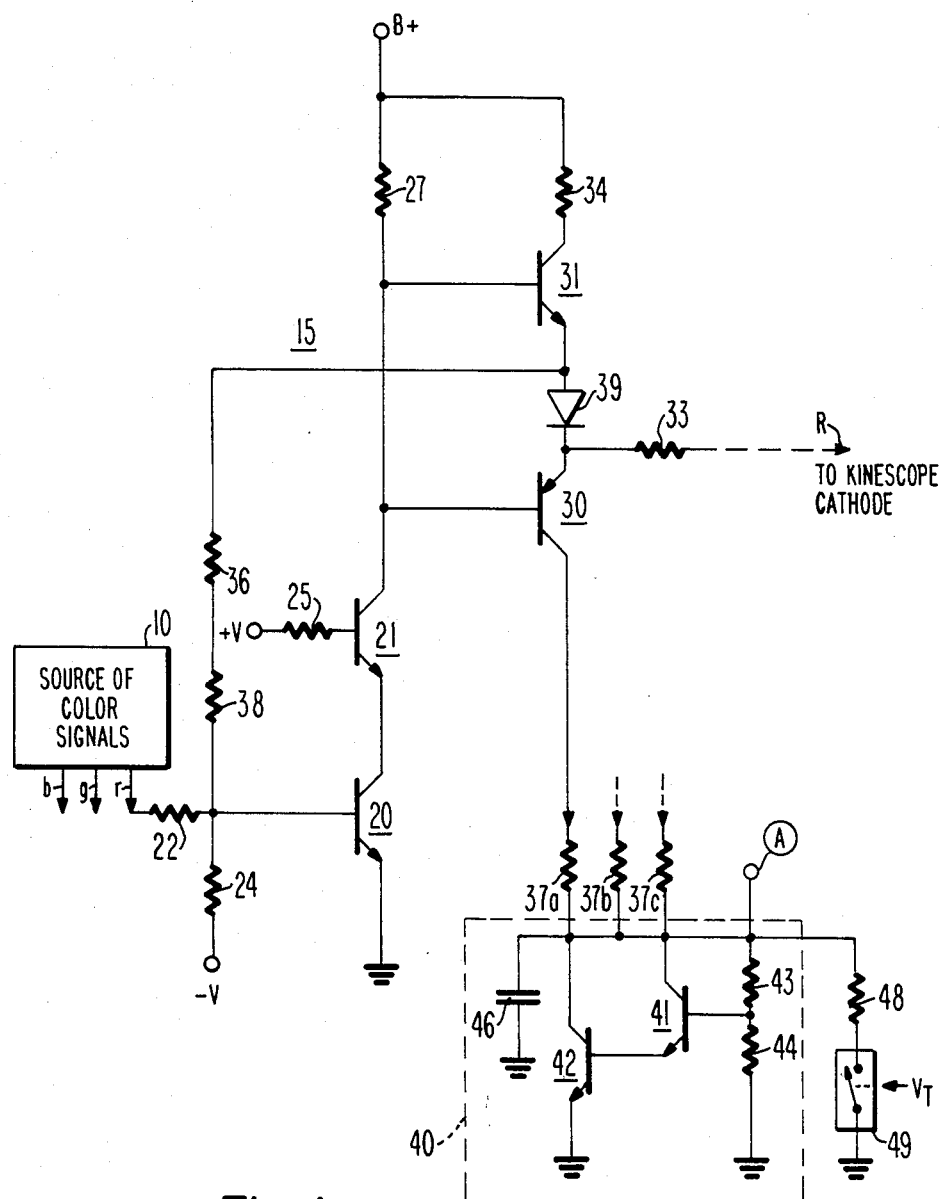

United States Patent [19]

George

[11] Patent Number: 4,642,696

[45] Date of Patent: Feb. 10, 1987

[54] KINESCOPE DRIVER WITH KINESCOPE CURRENT SENSING CIRCUIT

[75] Inventor: John B. George, Hamilton County, Ind.

[73] Assignee: RCA Corporation, Princeton, N.J.

[21] Appl. No.: 758,755

[22] Filed: Jul. 25, 1985

[51] Int. Cl.$^4$ .................. H04N 5/53; H04N 5/68; H04N 9/16
[52] U.S. Cl. ........................ 358/243; 358/74
[58] Field of Search ............... 358/242, 243, 172, 173, 358/74, 27, 34

[56] References Cited

U.S. PATENT DOCUMENTS

| | | | |
|---|---|---|---|
| 4,319,166 | 3/1982 | Lavigne | 315/384 |
| 4,484,229 | 11/1984 | Parker | 358/243 |
| 4,513,322 | 4/1985 | Filliman | 358/243 |
| 4,523,233 | 6/1985 | Tallant | 358/242 |

OTHER PUBLICATIONS

Technical publication for Digit 2000 Digital TV System, ITT Corp., p. 61, FIGS. 3-5.
Schematic circuit diagram of Matsushita color television receiver Model No. TH 21-H500GR.

Primary Examiner—Tommy P. Chin
Attorney, Agent, or Firm—P. J. Rasmussen; P. M. Emanuel; R. H. Kurdyla

[57] ABSTRACT

A television receiver includes a kinescope and a current sensing transistor for conveying amplified video signals to the kinescope, and for providing at a sensing output terminal an output signal related to the magnitude of kinescope current conducted during given sensing intervals. A clamping circuit clamps the sensing output terminal during normal image intervals, and unclamps the sensing output terminal during the sensing intervals. The clamping circuit facilitates interfacing the sensing transistor with utilization circuits which process the sensed output signal, and assists to maintain a proper operating condition for the sensing transistor.

10 Claims, 2 Drawing Figures

KINESCOPE DRIVER WITH KINESCOPE CURRENT SENSING CIRCUIT

This invention concerns a video output display driver amplifier for supplying high level video output signals to an image display device such as a kinescope in a television receiver. In particular, this invention concerns a display driver stage associated with a sensing circuit for providing a signal representative of the magnitude of current conducted by the kinescope during prescribed intervals.

Video signal processing and display systems such as television receivers commonly include a video output display driver stage for supplying a high level video signal to an intensity control electrode, e.g., a cathode electrode, of an image display device such as a kinescope. Television receivers sometimes employ an automatic black current (bias) control system or an automatic white current (drive) control system for maintaining desired kinescope operating current levels. Such control systems typically operate during image blanking intervals, at which time the kinescope is caused to conduct a black image or a white image representative current. Such current is sensed by the control system, which generates a correction signal representing the difference between the magnitude of the sensed representative current and a desired current level. The correction signal is applied to video signal processing circuits for reducing the difference.

Various techniques are known for sensing the magnitude of the black or white kinescope current. One often used approach employs a PNP emitter follower current sensing transistor connected to the kinescope cathode signal coupling path. Such sensing transistor couples video signals to the kinescope via its base-to-emitter junction, and provides at a collector electrode a sensed current representative of the magnitude of the kinescope cathode current. The representative current from the collector electrode of the sensing transistor is conveyed to the control system and processed to develop a suitable correction signal.

In accordance with the principles of the present invention, there is disclosed a kinescope current sensing arrangement wherein a current sensing device is coupled to a kinescope for providing at an output terminal a signal representative of the magnitude of the kinescope current. A clamping circuit clamps the output terminal to a given voltage during normal image trace intervals. During prescribed kinescope current sensing intervals, however, the clamping circuit is inoperative and the sensed signal representative of the kinescope current is developed at the output terminal. The clamping circuit advantageously facilitates interfacing the current sensing device with control circuits for processing the sensed signal, and assists to maintain a proper operating condition for the current sensing device which, in a disclosed embodiment, also conveys video signals to the display device. In accordance with a feature of the invention, the clamping circuit is self-keyed between clamping and non-clamping states in response to the representative signal at the output terminal.

Figure 2:
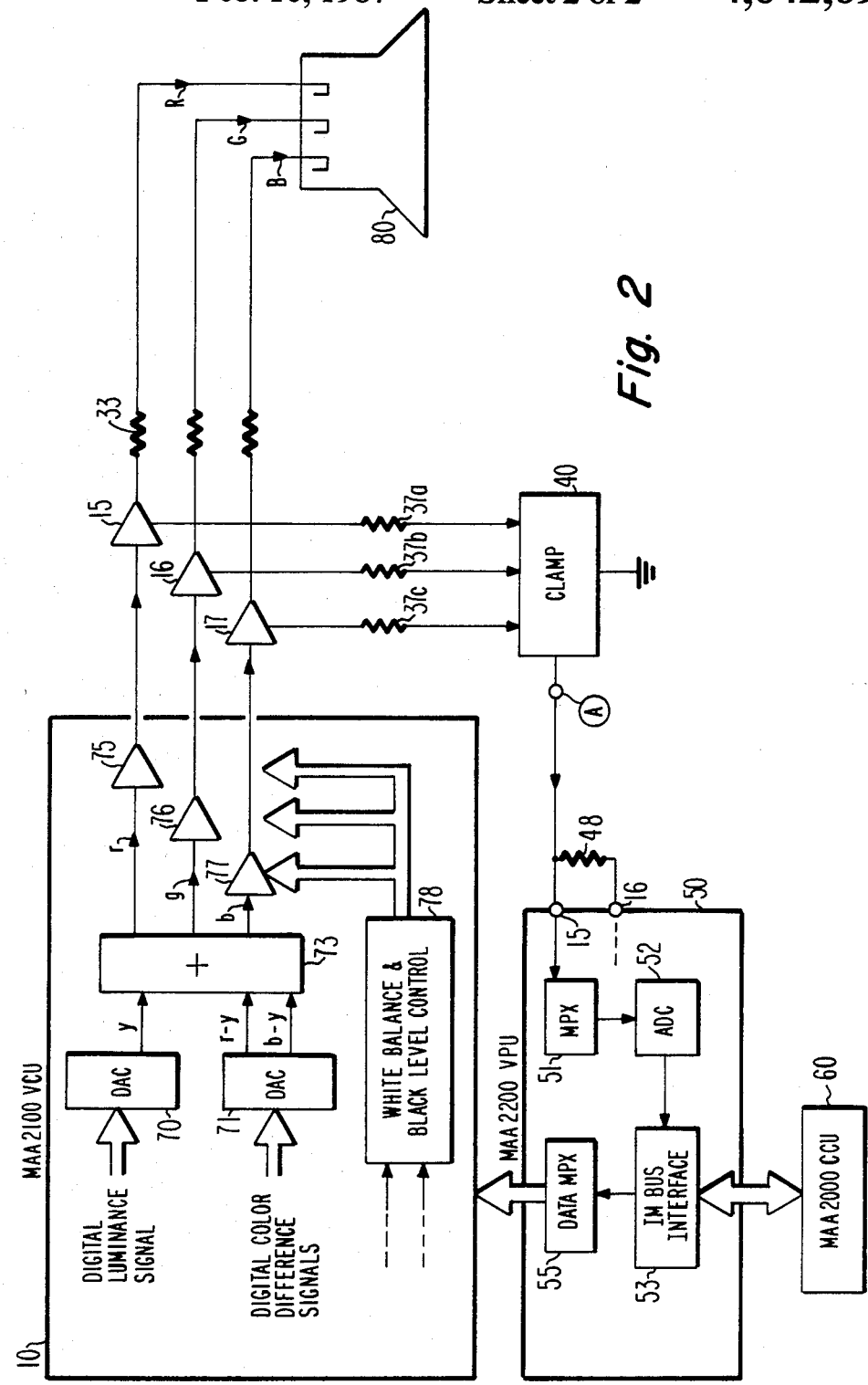

In the drawing:

FIG. 1 shows a circuit diagram of a kinescope driver stage with associated kinescope current sensing and clamping apparatus in accordance with the present invention; and FIG. 2 depicts, in block diagram form, a portion of a color television receiver incorporating the current sensing and clamping apparatus of FIG. 1.

In FIG. 1, low level color image representative video signals r, g, b are provided by a source 10. The r, g and b color signals are coupled to similar kinescope driver stages. Only the red (r) color signal video driver stage is shown in schematic circuit diagram form.

Red kinescope driver stage 15 comprises a driver amplifier including an input common emitter amplifier transistor 20 arranged in a cascode amplifier configuration with a common base amplifier transistor 21. Red color signal r is coupled to the base input of transistor 20 via a current determining resistor 22. Base bias for transistor 20 is provided by a resistor 24 in association with a source of negative DC voltage ($-V$). Base bias for transistor 21 is provided from a source of positive DC voltage ($+V$) through a resistor 25. Resistor 25 in the base circuit of transistor 21 assists to stabilize transistor 21 against oscillation.

The output circuit of driver stage 15 includes a load resistor 27 in the collector output circuit of transistor 21 and across which a high level amplified video signal is developed, and opposite conductivity type emitter follower transistors 30 and 31 with base inputs coupled to the collector of transistor 21. A high level amplified video signal R is developed at the emitter output of follower transistor 30 and is coupled to a cathode electrode of an image reproducing kinescope via a kinescope arc current limiting resistor 33. A resistor 34 in the collector circuit of transistor 31 also serves as a kinescope arc current limiting resistor. Degenerative feedback for driver stage 15 is provided by series resistors 36 and 38, coupled from the emitter of transistor 31 to the base of transistor 20.

A diode 39 connected between the emitters of transistors 30 and 31 as shown is normally reverse biased and therefore nonconductive by the voltage difference across it equalling the sum of the two base-emitter voltage drops of transistors 30 and 31, but is forward biased and therefore rendered conductive under certain conditions in response to positive-going transients at the emitter of transistor 30, corresponding to the output terminal of driver stage 15. The arrangement of transistor 31 prevents the amplifier feedback loop including transistors 20, 21 and 31 and resistors 36 and 38 from being disrupted, thereby preventing feedback transients and signal ringing from occurring. Additional details of the arrangement including transistors 30 and 31 and diode 39 are found in my copending U.S. patent application Ser. No. 758,954 titled "FEEDBACK DISPLAY DRIVER STAGE".

The emitter voltage of transistor 30 follows the voltage developed across load resistor 27, and transistor 30 conducts the kinescope cathode current. Substantially all of the kinescope cathode current flows as collector current of transistor 30, through a kinescope arc current limiting protection resistor 37a, to a clamping network 40. Transistor 30 acts as a current sensing device in conjunction with network 40 as will be explained. Clamping network 40 in this example is self-keyed to exhibit clamping and non-clamping states in response to the magnitude of the current conducted by transistor 30.

Clamping network 40 is common to all three driver stages of the receiver, as will be seen subsequently in connection with FIG. 2, and is coupled to the green and blue signal driver stages via protection resistors 37b and 37c. Network 40 includes clamping transistors 41 and 42 arranged in a Darlington configuration, and series voltage divider resistors 43 and 44 which bias clamp transistors 41 and 42. A high frequency bypass capacitor 46 filters signals in the collector circuit of transistor 30 in a manner to be described below. The series combination of a mode control switch 49 and a scaling resistor 48 is coupled across resistors 43 and 44. A voltage related to the magnitude of kinescope current is developed at a terminal A and, as will be explained with reference to FIG. 2, the voltage at terminal A can be used in conjunction with a feedback control loop to maintain a desired kinescope operating current condition which is otherwise subject to deterioration due to kinescope aging and temperature effects, for example.

Assuming switch 49, the function of which will be explained below, is open, the kinescope cathode current flowing in the collector of transistor 30 is conducted to ground via resistors 43 and 44. When this current causes a voltage drop across resistor 44 to sufficiently forward bias the base-emitter junctions of transistors 41 and 42, transistor 42 will conduct in a linear region, and will clamp terminal A to a voltage VA according to the following expression, where $V_{BE41}$ and $V_{BE42}$ are the base-emitter junction voltage drops of transistors 41 and 42:

$$VA = (V_{BE41} + V_{BE42})(R43 + R44)/R44$$

During normal image intervals typically there are greater than approximately 25 microamperes of current conducted by transistor 30, which is sufficient to render transistors 41 and 42 conductive for developing clamping voltage VA at terminal A. At other times, as will be discussed, transistors 41 and 42 are rendered nonconductive whereby clamping action is inhibited and a (variable) voltage is developed at node A as a function of the magnitude of the kinescope cathode current, for processing by succeeding control circuits.

Illustratively, the arrangement of FIG. 1 can be used in connection with digital signal processing and control circuits in a color television receiver employing digital signal processing techniques, as will be seen in FIG. 2. Such control circuits include an input analog-to-digital converter (ADC) for converting analog voltages developed at terminal A to digital form for processing.

When the control circuits are to operate in an automatic kinescope black current (bias) control mode, wherein during image blanking intervals the kinescope conducts very small cathode currents on the order of a few microamperes, approximating a kinescope black image condition, clamp transistors 41 and 42 are rendered nonconductive because such small currents flowing through resistors 43 and 44 from the collector of transistor 30 are unable to produce a large enough voltage drop across resistor 44 to forward bias transistors 41 and 42. Consequently terminal A exhibits voltage variations, as developed across resistors 43 and 44, related to the magnitude of kinescope black current. The voltage variations are processed by the control circuits coupled to terminal A to develop a correction signal, if necessary, to maintain a desired level of kinescope black current conduction by feedback action. In this operating mode switch 49, e.g., a controlled electronic switch, is maintained in an open position as shown in response to a timing signal VT developed by the control circuits.

When the control circuits are to operate in an automatic kinescope white current (drive) control mode wherein during image blanking intervals the kinescope conducts much larger currents representing a white image condition, switch 49 closes in response to timing signal VT, thereby shunting resistor 48 across resistors 43 and 44. The value of resistor 48 is chosen relative to the combined values of resistors 43 and 44 so that the larger current conducted via the collector of transistor 30 divides between series resistors 43, 44 and resistor 48 such that the magnitude of current conducted by resistors 43 and 44 is insufficient to produce a large enough voltage drop across resistor 44 to render clamping transistors 43 and 44 conductive. Unclamped terminal A therefore exhibits voltage variations related to the magnitude of kinescope white current, which voltage variations are processed by the control circuits to develop a correction signal as required. As used herein, the expression "white current" refers to a high level of individual red, green or blue color image current, or to combined high level red, green and blue currents associated with a white image.

With the illustrated configuration of transistors 41 and 42 clamping voltage VA is relatively low, approximately +2.0 volts. The clamping voltage could be provided by a Zener diode rather than the disclosed arrangement of Darlington-connected transistors 41 and 42, but the disclosed clamping arrangement is preferred because Zener diodes with a voltage rating less than about 4 volts usually do not exhibit a predictable Zener threshold voltage characteristic, i.e., the "knee" transition region of the Zener voltage-vs-current characteristic is usually not very well defined. In addition, the disclosed transistor clamp operates with better linearity than a Zener diode clamp and radiates less radio frequency interference (RFI).

The relatively low clamping voltage is compatible with the analog input voltage requirements of the analog-to-digital converter (ADC) at the input of the control circuits which receive the sensed voltage at terminal A as will be explained in greater detail with respect to FIG. 2. In this example the ADC is intended to process analog voltages of from 0 volts to approximately +2.5 volts, and the clamping voltage assures that excessively high analog voltages are not presented to the ADC during normal video signal intervals.

The relatively low clamping voltage also assists to prevent transistor 30 from saturating, which is necessary since transistor 30 is intended to operate in a linear region. To achieve this result and to maximize the cathode current conduction capability of transistor 30, the clamping voltage should be as low as possible to maintain a suitably low bias voltage at the collector of transistor 30. On the other hand, the value of arc current limiting resistor 37a should be large enough to provide adequate arc protection without compromising the objective of maintaining the collector bias voltage of transistor 30 as low as possible. Operation of transistor 30 in a saturated state renders transistor 30 ineffective for its intended purpose of properly conveying video drive signals to the kinescope cathode, and for conveying accurate representations of cathode current to clamping network 40 particularly in the white current control mode when relatively high cathode current levels are sensed. In addition, undesirable radio frequency interference (RFI) can be generated by transistor 30 switching into and out of saturation. Also, when saturation occurs transistor base storage effects can result in video image streaking due to the time required for a transistor to come out of a saturated state.

Thus clamping network 40 advantageously limits the voltage at terminal A to a level tolerable by the analog-to-digital converter at the input of the control circuits coupled to terminal A, and protects the analog-to-digital converter input from damage due to signal overdrive. Network 40 also provides a collector reference bias for transistor 30 to prevent transistor 30 from saturating on large negative-going signal amplitude transitions at its emitter electrode. The clamping voltage level is readily adjusted simply by tailoring the values of resistors 43 and 44.

Capacitor 46 bypasses high frequency video signals to ground to prevent transistor 30 from saturating in response to such signals. Capacitor 46 also serves to smooth out undesirable high frequency variations at terminal A to prevent potentially troublesome signal components such as noise from interfering with the signal processing function of the input analog-to-digital converter of the control circuits, e.g., by smoothing the current sensed during the settling time of the analog-to-digital converter.

The latter noise reducing effect is particularly desirable, for example, when the input ADC of the control circuits coupled to terminal A is of the relatively inexpensive and uncomplicated "iterative approximation" type ADC, compared to a "flash" type ADC. The operation of an iterative ADC, wherein successive approximations are made from the most significant bit to the least significant bit, requires a relatively constant or slowly varying analog signal to be sampled during sampling intervals, uncontaminated by noise and similar effects.

The value of capacitor 46 should not be excessively large because a certain rate of current variation should be permitted at terminal A with respect to kinescope cathode currents being sensed. If the value of capacitor 46 is too small, excessive voltage variations, particularly high frequency video signal variations, will appear at terminal A, increasing the likelihood of transistor 30 saturating. The speed of operation of the clamp circuit itself is restricted by an RC low pass filter effect produced by the base capacitance of transistor 41 and the equivalent resistance of resistors 43 and 44.

FIG. 2 shows a portion of a color television receiver system employing digital video signal processing techniques. The FIG. 2 system utilizes kinescope driver amplifiers and a clamping network as disclosed in FIG. 1, wherein similar elements are identified by the same reference number. By way of example, the system of FIG. 2 includes a MAA 2100 VCU (Video Codec Unit) corresponding to video signal source 10 of FIG. 1, a MAA 2200 VPU (Video Processor Unit) 50, and a MAAA 2000 CCU (Central Control Unit) 60. The latter three units are associated with a digital television signal processing system offered by ITT Corporation as described in a technical bulletin titled "DIGIT 2000 VLSI DIGITAL TV SYSTEM" published by the Intermetall Semiconductors subsidiary of ITT Corporation.

In unit 10, a luminance signal and color difference signals in digital form are respectively converted to analog form by means of digital-to-analog converters (DACs) 70 and 71. The analog luminance signal (Y) and analog color difference signals r-y and b-y are combined in a matrix amplifier 73 to produce r, g and b color image representative signals which are processed by preamplifiers 75, 76 and 77, respectively, before being coupled to kinescope driver stages 15, 16 and 17 of the type shown in FIG. 1. A network 78 in unit 10 includes circuits associated with the automatic white current and black current control functions.

The high level R, G and B color signals from driver stages 15, 16 and 17 are coupled via respective current limiting resistors (i.e., resistor 33) to cathode intensity control electrodes of a color kinescope 80. Currents conducted by the red, green and blue kinescope cathodes are conveyed to network 40 via resistors 37a-37c, for producing at terminal A a voltage representative of kinescope cathode current conducted during measuring intervals, as discussed previously.

VPU unit 50 includes input terminals 15 and 16 coupled to terminal A. Through terminal 15 the VPU receives the analog signal from terminal A and, via an internal multiplex switching network 51, the analog signal is supplied to an analog-to-digital-converter (ADC) 52. Terminal 16 is connected to an internal switching device (corresponding to switch 49 in FIG. 1) which, in conjunction with scaling resistor 48, controls the impedance and therefore the sensitivity at input terminal 15. High sensitivity for black current measurement is obtained with resistor 48 ungrounded by internal switch 49, and low sensitivity for white current measurement is obtained with resistor 48 grounded by internal switch 49.

The digital signal from ADC 52 is coupled to an IM BUS INTERFACE unit 53 which coacts with CCU unit 60 and provides signals to an output data multiplex (MPX) unit 55. Multiplexed output signal data from unit 55 is conveyed to VCU unit 10, and particularly to control network 78. Control network 78 provides output signals for controlling the signal gain of preamplifiers 75, 76 and 77 to achieve a correct white current condition, and also provides output signals for controlling the DC bias of the preamplifiers to achieve a correct black current condition.

More specifically, during vertical image blanking intervals the three (red, green, blue) kinescope black currents subject to measurement and the three white currents subject to measurement are developed sequentially, sensed, and coupled to VPU 50 via terminal 15. The sensed values are sequenced, digitized and coupled to IM Bus Interface 53 which organizes the data communication with CCU 60. After being processed by CCU 60, control signals are routed back to interface 53 and from there to data multiplexer 55 which forwards the control signals to VCU 10.

What is claimed is:

1. In a video signal processing system including an image reproducing device for displaying video information in response to a video signal applied thereto, apparatus comprising:
   a video output driver stage with a video signal input and a video signal output for providing an amplified video signal;
   means for conveying said amplified video signal to said image reproducing display device, said conveying means having a sensing output for providing thereat a sensed signal representative of the current conducted by said image reproducing display device;
   utilization means responsive to said sensed signal; and
   clamping means for selectively clamping said sensing output during normal image intervals, and for unclamping said sensing output during intervals when said sensed signal representative of current conducted by said image reproducing display device is subject to processing by said utilization means; wherein said clamping means comprises clamping transistor means with an output first electrode coupled to said sensing output, a second electrode coupled to an operating potential, and an input third electrode coupled to said sensing output, the conduction of said clamping transistor means being controlled in accordance with the magnitude of said sensed signal as received by said third electrode; and said clamping transistor means is self-keyed to exhibit clamping and non-clamping states in response to said sensed representative signal.

2. Apparatus according to claim 1, wherein:

said video output stage comprises a video amplifier with a video signal input and a video signal output for providing said amplified video signal; and said conveying means comprises an active current conducting device with an input first terminal for receiving said amplified video signal, an output second terminal for conveying said amplified video signal to said image reproducing display device, and a third terminal for providing said sensed signal.

3. Apparatus according to claim 2, wherein said active current conducting device is a transistor with a base input for receiving said amplified video signal, an emitter output for providing said amplified video signal to said image reproducing display device, and a collector output for providing said sensed signal.

4. Apparatus according to claim 1, wherein said first and second electrodes define a main current conduction path of said clamping transistor means.

5. Apparatus according to claim 4, wherein said clamping means includes resistive means coupled to said sensing output for providing a voltage in accordance with the magnitude of said sensed signal; and said third electrode of said clamping transistor means is coupled to said resistive means.

6. Apparatus according to claim 1, and further comprising filter means for bypassing high frequency signal components at said sensing output.

7. In a video signal processing system including an image reproducing device for displaying video information in response to a video signal applied thereto, apparatus comprising:

a video output driver stage coupled to said image reproducing display device for providing an amplified video signal thereto, and having a sensing output for providing thereat a sensed signal representative of the current conducted by said image reproducing display device;

control means responsive to said sensed signal for developing a control signal;

means for coupling said control signal to said image reproducing display device to maintain a desired conduction characteristic of said image reproducing display device; and clamping means for selectively clamping said sensing output during normal image intervals, and for unclamping said sensing output during intervals when said control means operates to monitor said sensed signal; wherein said clamping means comprises clamping transistor means with an output first electrode coupled to said sensing output, a second electrode coupled to an operating potential, and an input third electrode coupled to said sensing output, the conduction of said clamping transistor means being controlled in accordance with the magnitude of said sensed signal as received by said third electrode; and said clamping transistor means is self-keyed to exhibit clamping and non-clamping states in response to said sensed signal.

8. Apparatus according to claim 7, wherein said control means includes digital signal processing circuits; and said control means includes an input analog-to-digital signal converter network.

9. In a video signal processing system including an image reproducing device for displaying video information in response to a video signal applied thereto, apparatus comprising:

a video amplifier with a video signal input for receiving video signals, and a video signal output for providing an amplified video signal;

a signal coupling transistor with an input first electrode for receiving said amplified video signal from said video amplifier, an output second electrode for providing a further amplified video signal to said image reproducing display device, and a third electrode for providing a sensed signal representative of the magnitude of the current conducted by said image reproducing display device;

utilization means responsive to said sensed signal; and clamping means for selectively clamping said third electrode of said coupling transistor during normal image intervals, and for unclamping said third electrode during interval when said sensed representative signal is subject to processing by said utilization means, said clamping means comprising clamping transistor means with an output first electrode coupled to said third electrode of said signal coupling transistor, a second electrode coupled to an operating potential, and an input third electrode coupled to said third electrode of said signal coupling transistor, the conduction of said clamping transistor means being controlled in accordance with the magnitude of said sensed signal as received by said input third electrode of said clamping transistor means.

10. Apparatus according to claim 9, wherein said coupling transistor is an emitter follower transistor with a base input electrode, an emitter output electrode, and a collector output electrode corresponding to said third electrode.

* * * * *